United States Patent
Lenhart et al.

[19]

[11] Patent Number: 6,025,696
[45] Date of Patent: Feb. 15, 2000

[54] BATTERY CELL BYPASS MODULE

[75] Inventors: Stephen John Lenhart, Mountain View; Michael J. McVey, Palo Alto, both of Calif.

[73] Assignee: Space Systems/Loral, Inc., Palo Alto, Calif.

[21] Appl. No.: 09/049,450

[22] Filed: Mar. 27, 1998

[51] Int. Cl.$^7$ ............................................. H01M 10/46
[52] U.S. Cl. ......................................................... 320/122
[58] Field of Search .................................... 320/116, 118, 320/119, 120, 122, FOR 105, FOR 114, FOR 116, FOR 117

[56] References Cited

U.S. PATENT DOCUMENTS

| | | | |
|---|---|---|---|
| 4,061,955 | 12/1977 | Thomas et al. | 320/122 |
| 4,303,877 | 12/1981 | Meinhold | 320/122 |
| 4,614,905 | 9/1986 | Petersson et al. | 320/122 |
| 4,719,401 | 1/1988 | Altmejd | 320/122 |
| 5,666,040 | 9/1997 | Bourbeau | 320/122 |
| 5,675,233 | 10/1997 | Kaneko et al. | 320/122 |
| 5,764,063 | 6/1998 | Katou et al. | 320/122 X |
| 5,821,733 | 10/1998 | Turnbull | 320/122 X |
| 5,880,575 | 3/1999 | Itou et al. | 320/122 |

OTHER PUBLICATIONS

National Semiconductor News Release: "Industry's First Lithium Battery Charge Controller", Apr. 12, 1996, 2 pages.
National Semiconductor Document, "LM3420 Handles Charging, End–of–Charge Control For Li–Ion Batteries" undated but publicly transmitted on May 20, 1997, 1 page.
EDN Magazine, "Proper handling helps make the most of Li–Ion batteries", Dec. 5, 1996, pp. 179–190.

*Primary Examiner*—Edward H. Tso
*Attorney, Agent, or Firm*—Perman & Green, LLP

[57] ABSTRACT

A battery cell bypass module comprises a sensor for detecting an operating condition of a battery cell such as voltage or temperature and a controller connected across the battery cell of a lithium ion battery, for example, and having a conductive mode and a normally non conductive mode. The controller is operable to change to the conductive mode when an operating condition of the battery cell exceeds a predetermined value to thereby shunt current around the battery cell. The sensor may be a temperature transducer such as a thermistor for measuring battery cell temperature and a cell temperature comparator such as an operational amplifier is operable to generate a temperature excessive signal when the signal from the temperature transducer exceeds a predetermined value, the controller then being operable to change to the conductive mode and thereby shunt current around the battery cell. The sensor may also be a voltage comparator, also an operational amplifier, for measuring voltage across the cell, the controller being operable in response to a voltage excessive signal to change the controller to the conductive mode and thereby shunt current around the battery cell. The controller includes a voltage limiting operational amplifier operable for transmitting a voltage excessive output signal when the input thereto exceeds a predetermined value and a transistor having a predetermined gate voltage allowing bypass current flow, the transistor being responsive to the voltage excessive output signal from the voltage limiting operational amplifier to shunt current around the battery cell.

15 Claims, 1 Drawing Sheet

BATTERY CELL BYPASS MODULE

BACKGROUND OF THE INVENTION

1. Field of the Invention

The present invention relates generally to battery cell management devices and, more particularly, to a novel technique for bypassing a failed cell of a multi cell battery.

2. Description of the Prior Art

While the present invention is not limited to lithium ion batteries, it has a particular benefit when applied to their use because of their unique operating characteristics. Lithium ion batteries are rapidly becoming the power source of choice for space applications. They exhibit high energy and power both per unit volume and per unit weight in comparison with NiCd, nickel-metal hydride (NiMH), and other rechargeable types.

Because of one of their unique operating characteristics, lithium ion battery cells require careful charge management to ensure that significant over charge and over discharge does not occur. This is for the reason that lithium ion batteries possess an extreme sensitivity to overcharging and overdischarging not found in most other types of batteries. Such charge management may be achieved by limiting the maximum voltage to which the cell is charged. In order to achieve the maximum possible energy stored in the cell while limiting the over charge and over discharge, a device is required that controls the voltage. Also, in many applications, if a cell opens, then the whole battery would be lost. It is desirable to allow the cell to be completely bypassed if it fails in this manner. The ability to monitor temperature and adjust the maximum charge voltage accordingly is also desirable. A feature to allow varying the charge voltage setpoint from outside the device is also desired.

Previous battery cell management devices for nickel hydrogen or nickel cadmium cells typically used diodes or a relay device to short out failed cells. These earlier battery technologies were not as sensitive to over charge as lithium ion cells and consequently did not require devices to precisely control each individual cell voltage.

Other known prior art includes the approach typically used by automotive applications that are presently under development. The approach used is to connect a relay or electronic switch in series with a fixed resistor that is connected around the cell. Some appropriate circuit or computer is used to monitor cell voltage and closes the relay when a maximum voltage limit is reached. The resistor is set to shunt some or all of the current around the cell so that it slows or stops charging. This approach is inexpensive and simple but does not provide optimal charge control and may reduce battery life. In particular, the relay bypass approach may not provide sufficient reliability in a space application where high energy cells are used.

It was in light of the state of the technology as just discussed that the present invention was conceived and has now been reduced to practice.

SUMMARY OF THE INVENTION

A battery cell bypass module comprises a sensor for detecting an operating condition of a battery cell such as voltage or temperature and a controller connected across the battery cell of a lithium ion battery, for example, and having a conductive mode and a normally non conductive mode. The controller is operable to change to the conductive mode when an operating condition of the battery cell exceeds a predetermined value to thereby shunt charging current around the battery cell. The sensor may be a temperature transducer such as a thermistor for measuring battery cell temperature and a cell temperature comparator such as an operational amplifier is operable to generate a temperature excessive signal when the signal from the temperature transducer exceeds a predetermined value, the controller then being operable to change to the conductive mode and thereby shunt current around the battery cell. The sensor may also be a voltage comparator, also an operational amplifier, for measuring voltage across the cell, the controller being operable in response to a voltage excessive signal to change the controller to the conductive mode and thereby shunt current around the battery cell. The controller includes a voltage limiting operational amplifier operable for transmitting a voltage excessive output signal when the input thereto exceeds a predetermined value and a transistor having a predetermined gate voltage allowing bypass current flow, the transistor being responsive to the voltage excessive output signal from the voltage limiting operational amplifier to shunt current around the battery cell.

At this point, consider a particularly important feature of the present invention. When a lithium ion cell charges at constant current, the cell voltage slowly approaches the end-of-charge value. When the cell bypass device turns on, the cell voltage is clamped at the end-of-charge value. An important consequence of the design of the invention is that the battery voltage (the total voltage of many cells in series) does not change in a discontinuous manner when the cell bypass devices turns on. Such an undesirable discontinuous change may be accomplished, for example, by a relay switch that removes the cell from the circuit when the cell reaches its end-of-charge or maximum voltage condition. There is no discontinuous voltage change and the battery charge controller does not need to be designed to handle large discontinuous voltage changes as each cell bypass device turns on.

An alternate inferior design could use a relay or switch bypass device. The electric vehicle lithium ion battery bypass devices use this type of approach, for example. When the cell voltage reaches the cutoff value, the relay switches the cell out of the circuit. In this instance, the battery voltage would drop by about 4.2 volts. When the next cell in the series string hit the cutoff voltage, then its relay would drop the battery voltage by another 4.2 volts. When all the cells are bypassed, the battery voltage would be zero volts. All of the cells would be relay bypassed. With this design approach, the battery charger would have to control the battery charging process over a very wide voltage range, which would make the charger design more expensive and less efficient. Also, with this approach, all of the cells are switched out of the circuit at end-of-charge and they must by switched back on again before the battery is able to support the spacecraft loads. The spacecraft would be in an unsafe condition with the battery cells switched out of the circuit. If the spacecraft were to experience an upset and battery power was suddenly needed, then the relay switching process would have to occur before the battery could again provide power.

Other similar relay or switched approaches are also possible alternatives to the invention disclosure approach. A relay can switch to a resistor and take the cell out of the battery cell string. The new voltage across the switched cell would be IxR, but this value would not necessarily be the same as the charged cell voltage. Alternately, the relay could switch a resistor in parallel with the cell. Depending on the charge current, this alternate approach allows the cell to partially discharge while the other cells continue to charge, and cell-to-cell charge balancing occurs by controlling the resistor switching. For a spacecraft, both of these alternate approaches utilize fairly high power relays or switches that are heavy and may not have an adequate reliability These disadvantages are in addition to the charger control problem and the "upset condition" problem described in the previous paragraph.

The bypass circuit of the present invention actually provides several levels of cell and battery protection. An additional "failsafe" operational amplifier which monitors cell voltage would preferably actually be two operational amplifiers. One becomes operable, for example, with an excessively high charging voltage (e.g. 4.3V), and the other becomes operable, for example, with an excessively low discharging voltage (e.g. 2.9V). If either operational amplifier senses an out-of-range condition, then a switch would be operated and the cell shorted. A resistor would desirably be added in series with the switch to limit the shorting current. The switch could be latching or resettable.

A diode in parallel with the cell is another safety device that may be added to the circuit to protect against over discharge. It might be a high power Schottky diode with a low forward bias voltage. A regular silicon junction diode could also be used. The Schottky diode should conduct above about 0.4V, whereas the silicon junction diode would conduct above about 0.7V. Diode conduction can only occur in the circuit when the negative terminal on the cell is 0.4V positive with respect to the positive terminal, that is when the cell voltage is reversed. This cannot happen naturally when a single cell discharges across a load, but it can happen in a battery when one cell has a significantly lower capacity relative to the other cells, and the battery discharges across a load. If a cell fails open circuit during discharge, the operational amplifier which monitors cell voltage would detect a low discharge voltage and would throw the switch. However, during the short time interval before the switch can be thrown, the open circuit cell voltage may go negative enough to forward bias the diode. Therefore, diode conduction would only occur until the switch is thrown. The diode which is typically a Schottky diode to limit voltage drop and consequently power dissipation is placed across the cell. If the cell fails in an open circuit condition, the diode bypasses the cell and the remaining cells in the battery can still function.

The bypass circuit of the invention uses a transistor which might typically be a bipolar or MOSFET connected across the battery cell. The transistor is linearly turned on under the control of amplifiers that monitor the voltage, temperature and desired set-points.

One amplifier monitors a temperature sensing device such as a thermistor and provides a voltage signal that is used by the voltage limiting amplifier to vary the limit voltage as a function of temperature. This allows various combinations of control. For example if it is desired that a higher voltage limit be allowed at a lower temperature, the circuit could provide such a result.

Another amplifier differentially monitors the battery cell voltage and provides a voltage to an amplifier that controls the transistor in such a way that if the voltage exceeds a certain limit, the transistor begins to linearly turn on and shunt current around the cell thereby limiting the voltage.

Still another pair of amplifiers monitor the cell voltage. If the cell voltage exceeds a maximum or minimum limit, it can be concluded that the battery cell has failed. These amplifiers then close the switch which bypasses the defective cell and allows the remainder of the battery to function.

In keeping with the invention, one bypass device would be required for each battery cell. Possible implementations might use hybrids, ASICS or a custom integrated circuit design. The bypass device of the invention is applicable to any usage of lithium ion batteries including commercial or automotive applications.

A primary feature of the invention, then, is to provide an improved battery cell management device.

Another feature of the invention is to provide a novel technique for bypassing a failed cell of a multi cell battery.

Still another feature of the invention is to provide a novel technique that does not change the cell voltage in a discontinuous manner when the cell bypass device is operated.

Yet another feature of the invention is to provide such a novel technique which can be used for space applications.

Still a further feature of the invention is to provide such a novel technique which allows variation in shunted current.

Yet a further feature of the invention is to provide such a novel technique which utilizes diode bypassing to protect against open cells.

Still a further feature of the invention is to provide such a novel technique which is capable of handling large batteries having capacities in excess of approximately 40 Ah.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

DETAILED DESCRIPTION OF THE PREFERRED EMBODIMENT

Figure 1:
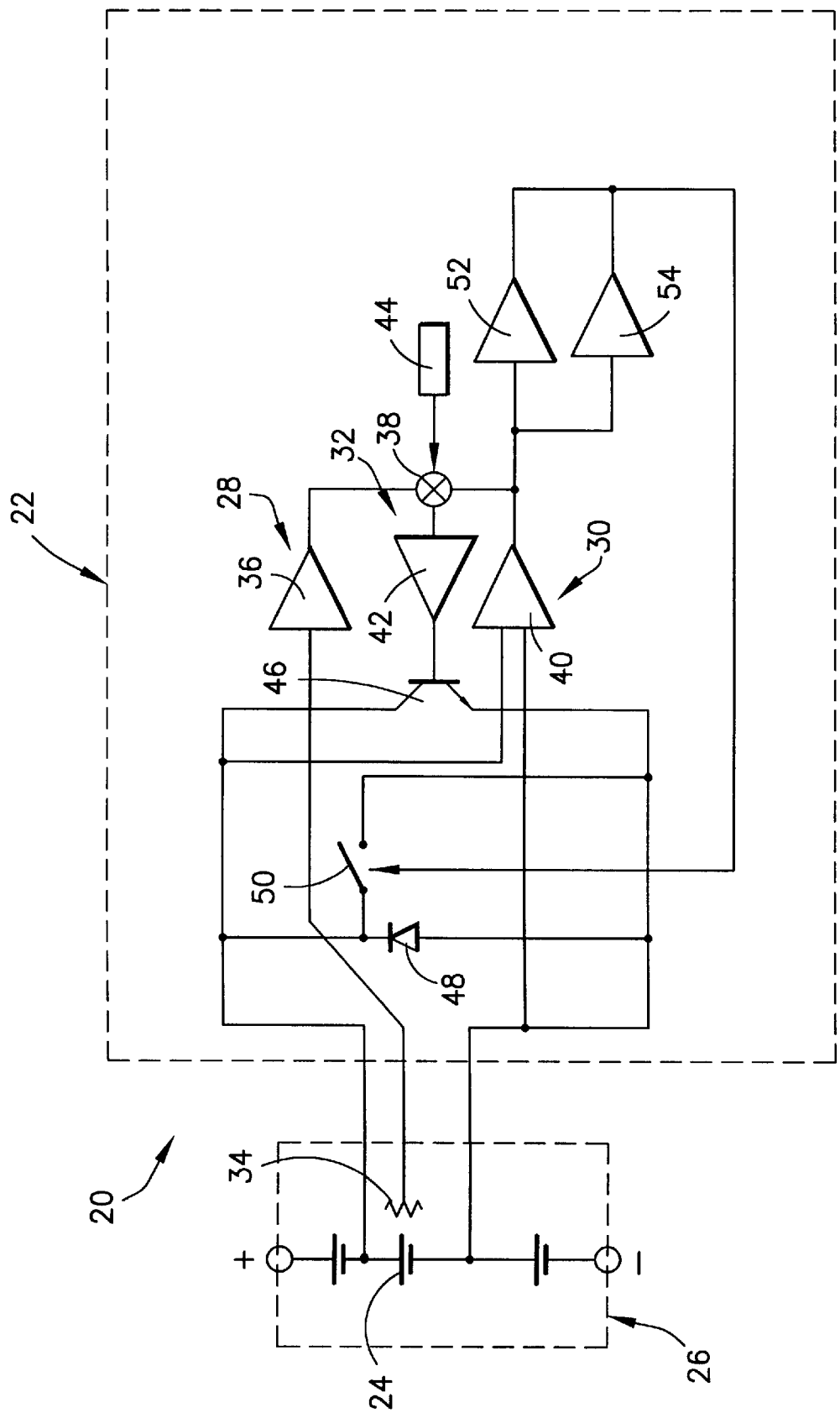
FIG. 1 is a schematic diagram of an electrical circuit embodying the present invention.

Turn now to the drawing which diagrammatically illustrates an electrical circuit 20 embodying the present invention. More specifically, a battery cell bypass module 22 is connected across a cell 24 of a battery 26 including a plurality of such cells. It was earlier mentioned that while the invention is not to be so limited, a particularly useful application of the invention is in conjunction with lithium ion batteries which are presently in great demand for powering onboard systems of space vehicles. Hence, in the ensuing description, it will be assumed that the battery 26 is a lithium ion battery.

The module 22 includes first and second sensing devices 28, 30, respectively, for detecting an operating condition of the battery cell 24. A controller 32 is connected across the battery cell, has a conductive mode and a normally non conductive mode, and is operable in response to an operating condition of the battery cell, as determined by the sensing devices 28, 30, in excess of a predetermined magnitude to change to the conductive mode and thereby shunt current around the battery cell.

The first sensing device 28 includes a temperature transducer 34 such as a thermistor for measuring the temperature of the battery cell and generating a temperature signal proportional thereto. It also includes a cell temperature amplifier 36 operable for generating a temperature dependent voltage signal that is directed to an input summing point 38 adjacent and connected to the controller 32. The cell temperature amplifier generating the temperature dependent voltage signal is preferably an operational amplifier.

The second sensing device 30 includes cell voltage amplifier 40 for measuring voltage across the cell 24 and for generating a voltage excessive signal proportional to a voltage exceeding a predetermined value. As with the cell temperature amplifier 36, the cell voltage amplifier 40 is preferably an operational amplifier. Also, similarly to the cell temperature comparator 36, the voltage excessive signal is directed to the input summing point 38 adjacent to the controller 32.

In response to operation of either or both of the amplifiers 36, 40, the controller 32 is subject to the voltage excessive signal and/or the temperature excessive signal at the input summing point 38, as appropriate, to change to a partially or fully the conductive mode and thereby shunt current around the battery cell. The controller 32 includes a voltage limiting operational amplifier 42 operable for receiving a signal from the input summing point 38, then transmitting a voltage excessive output signal when the input thereto exceeds a predetermined value. It will be appreciated that the input device 38 is not only subject to receive voltage signals from the amplifiers 36, 40, but also from a trimming voltage adjust 44, an external device for adjusting the voltage value at which the output signal is generated by the voltage limiting operational amplifier. In short, the trimming voltage adjust 44 enables the remote introduction of signals as needed.

The controller 32 also includes a transistor 46 having a predetermined gate voltage allowing bypass current flow. The transistor 46 is responsive to the voltage excessive output signal from the voltage limiting operational amplifier 42 to shunt current around the battery cell 24.

The battery cell bypass module 22 also includes a suitable normally open actuating switch 50 connected across the cell 24 and movable between open and closed positions. The actuating switch may be either of the latching type or of the non-latching type. Associated with the actuating switch 50 are a pair of over/under voltage comparators 52, 54, respectively, each being an operational amplifier. The comparators 52, 54 are in parallel and both are situated to receive the output signal from the voltage comparator 30. Thus, the comparator 52 is responsive to voltage across the battery cell to generate a voltage excessive actuating signal in the event the voltage across the battery cell exceeds a predetermined maximum value and the comparator 54 is responsive to voltage across the battery cell to generate a voltage minimal actuating signal in the event the voltage across the battery cell falls below a predetermined minimal value. The actuating switch 50 is responsive to either the voltage excessive actuating signal from the comparator 52 or to the voltage minimal actuating signal from the comparator 54 to move to the closed position, and in either instance, electric current is shunted around the battery cell.

The module 24 also includes a suitable diode 48 connected across the battery cell 24 and responsive to failure of the cell for shunting current flow around the cell. Thus, if the cell 24 is discharging, and suddenly goes "open circuit", or fails, the diode 48 will instantaneously turn on to allow time to close the actuating switch 50 which, for purposes of the invention, is preferably a latching switch. Actuating switch 50 is operated by the under voltage detect operational amplifier 54. If the actuating switch 50 were not a latching switch and the failed cell 24 changes to the charge mode, then actuating switch would open again because the comparator 54 no longer is sensing an under voltage and comparator 52 is now sensing an over voltage, closing the actuating switch again. Then, the transistor 46 keeps the battery 26 operating until the actuating switch 50 closes. It is noteworthy that there is a delay in the operation of the actuating switch 50 following the open or close signals from the comparators 52, 54 by reason of its mechanical nature. Also, an oppositely directed diode is not needed for a sudden open circuit failure in the charge mode because operational amplifier 42 and transistor 46 operating together will perform such a function.

The invention just described has particular suitability to high energy batteries of the type used in spacecraft systems, typically those having capacities in excess of approximately 40 Ah. In this regard, bypass current can be continuously varied to provide a fixed voltage limit with a given setting, although that setting may be varied externally by means of the voltage adjust 44. Also, there are no discontinuous voltage changes when the bypass module 22 activates. The bypass module 22 is highly reliable and, without relays no undesirable arcing occurs.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. A battery cell bypass module comprising:

sensing means for detecting an operating condition of a battery cell;

controller means connected across the battery cell and having a conductive mode and a normally non conductive mode, said controller means being operable in response to an operating condition of the battery cell in excess of a predetermined magnitude to change to the conductive mode and thereby shunt current around the battery cell; and normally open actuating switch means connected across the cell and movable between open and closed positions; and comparator means responsive to voltage across the battery cell to generate, in one instance, a voltage excessive actuating signal in the event the voltage across the battery cell exceeds a predetermined maximum value and, in another instance, a voltage minimal actuating signal in the event the voltage across the battery cell falls below a predetermined minimal value;

said actuating switch means responsive to either said voltage excessive actuating signal or to said voltage minimal actuating signal to move to the closed position;

whereby electric current is shunted around the battery cell.

2. A battery cell bypass module as set forth in claim 1 wherein the battery cell is a lithium ion battery cell.

3. A battery cell bypass module as set forth in claim 1 wherein said sensing means is a temperature transducer for measuring the temperature of the battery cell and generating a temperature signal proportional thereto; and including:

cell temperature comparator means operable for generating a temperature excessive signal when said signal from said temperature transducer exceeds a predetermined value, said controller means being operable in response to said temperature excessive signal to change to the conductive mode and thereby shunt current around the battery cell.

4. A battery cell bypass module as set forth in claim 3 wherein said temperature transducer is a thermistor.

5. A battery cell bypass module as set forth in claim 3 wherein said cell temperature comparator means includes a first operational amplifier.

6. A battery cell bypass module as set forth in claim 1 including:
   wherein said sensor means includes:
      voltage comparator means for measuring voltage across the cell and for generating a voltage excessive signal proportional to a voltage exceeding a predetermined value, said controller means being operable in response to said voltage excessive signal to change said controller means to the conductive mode and thereby shunt current around the battery cell.

7. A battery cell bypass module as set forth in claim 6 wherein said voltage comparator means includes a second operational amplifier.

8. A battery cell bypass module as set forth in claim 1 wherein said controller means includes:
   a voltage limiting operational amplifier operable for transmitting a voltage excessive output signal when the input thereto exceeds a predetermined value; and
   a transistor having a predetermined gate voltage allowing bypass current flow, said transistor being responsive to said voltage excessive output signal from said voltage limiting operational amplifier to shunt current around the battery cell.

9. A battery cell bypass module as set forth in claim 8 including
   external means for adjusting the voltage value at which said output signal is generated by said voltage limiting operational amplifier.

10. A battery cell bypass module as set forth in claim 1 including:
    diode means connected across the battery cell responsive to failure of the cell for shunting current flow around the cell.

11. A battery cell bypass module as set forth in claim 1 including:
    diode means connected across the battery cell instantaneously responsive to failure of the cell for shunting current flow around the cell while awaiting operation of said actuating switch means.

12. In combination:
    a battery including a plurality of battery cells;
    a battery cell bypass module connected across at least one of said battery cells and including:
       sensing means for detecting an operating condition of said battery cell;
       controller means connected across said battery cell and having a conductive mode and a normally non conductive mode, said controller means being operable in response to an operating condition of said battery cell to change to the non conductive mode and thereby shunt current around said battery cell;
       normally open actuating switch means connected across the cell and movable between open and closed positions; and
       comparator means responsive to voltage across the battery cell to generate, in one instance, a voltage excessive actuating signal in the event the voltage across the battery cell exceeds a predetermined maximum value and, in another instance, a voltage minimal actuating signal in the event the voltage across the battery cell falls below a predetermined minimal value;
       said actuating switch means responsive to either said voltage excessive actuating signal or to said voltage minimal actuating signal to move to the closed position;
       whereby electric current is shunted around the battery cell.

13. A battery cell bypass module comprising:
    sensing means for detecting an operating condition of a battery cell; and
    controller means connected across the battery cell and having a conductive mode and a normally non conductive mode, said controller means being operable in response to an operating condition of the battery cell in excess of a predetermined magnitude to change to the conductive mode and thereby shunt current around the battery cell while the voltage of the battery cell present at the time of the operation of said controller means remains unchanged;
    normally open actuating switch means connected across the cell and movable between open and closed positions, and
    comparator means responsive to voltage across the battery cell to generate, in one instance, a voltage excessive actuating signal in the event the voltage across the battery cell exceeds a predetermined maximum value and, in another instance, a voltage minimal actuating signal in the event the voltage across the battery cell falls below a predetermined minimal value;
    said actuating switch means responsive to either said voltage excessive actuating signal or to said voltage minimal actuating signal to move to the closed position;
    whereby electric current is shunted around the battery cell.

14. A battery cell bypass module as set fourth in claim 1 wherein the battery cell has a capacity in excess of approximately 40 Ah.

15. A battery cell bypass module comprising:
    sensing means for detecting an operating condition of a battery cell;
    controller means connected across the battery cell and having a conductive mode and a normally non conductive mode, said controller means being operable in response to an operating condition of the battery cell in excess of a predetermined magnitude to change to the conductive mode and thereby shunt current around the battery cell; and
    diode means connected across the battery cell responsive to failure of the cell for shunting current flow around the cell.

* * * * *